May 15, 1923.
J. E. MUHLFELD ET AL
FUEL FEEDING APPARATUS
Filed Nov. 21, 1918
1,454,979
Fig:1.
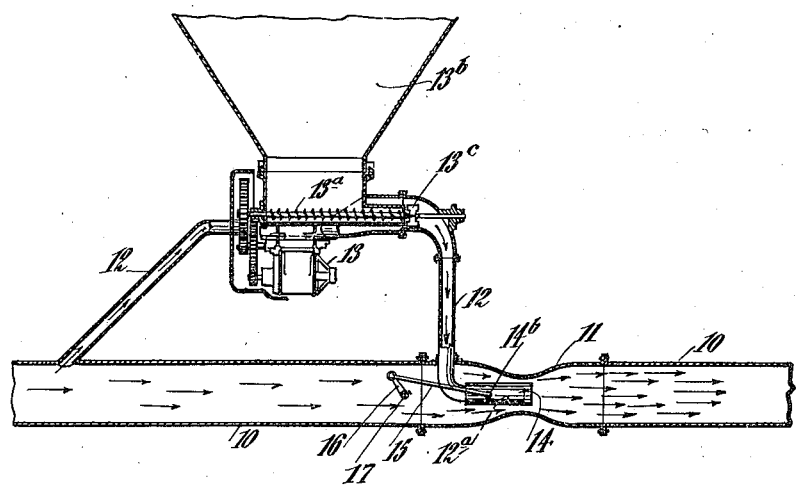
Fig:2.
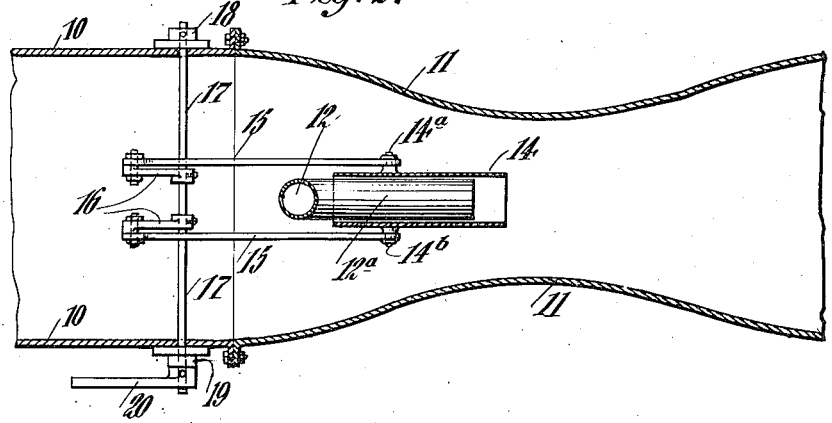
INVENTORS
John E. Muhlfeld and
Virginius Z. Caracristi
BY K. P. Goepel.
ATTORNEY Patented May 15, 1923.

1,454,979

UNITED STATES PATENT OFFICE.

JOHN E. MUHLFELD, OF SCARSDALE, AND VIRGINIUS Z. CARACRISTI, OF BRONXVILLE, NEW YORK, ASSIGNORS TO LOCOMOTIVE PULVERIZED FUEL COMPANY, OF NEW YORK, N. Y., A CORPORATION OF DELAWARE.

FUEL-FEEDING APPARATUS.

Application filed November 21, 1918. Serial No. 263,459.

*To all whom it may concern:*

Be it known that we, JOHN E. MUHLFELD and VIRGINIUS Z. CARACRISTI, both citizens of the United States of America, the former a resident of Scarsdale, in the county of Westchester and State of New York, and the latter a resident of Bronxville, in the county of Westchester and State of New York, have invented certain new and useful Improvements in Fuel-Feeding Apparatus, of which the following is a specification.

The present invention relates to an improved process and apparatus for feeding and mixing pulverized fuel and air. Heretofore it has been the usual practice, in such apparatus to provide two separate sources of air of different velocity pressures, the one for providing mixed fuel and air, while the other conveys the mixed fuel and air to the mixing chamber of the furnace.

In the present invention we proposed to provide a single source of air having velocity pressure (blast air) and in connection therewith a main conduit, a velocity increasing means, in the present embodiment a venturi structure, and a branch conduit extending from said main conduit and returning to the same and receiving fuel from the fuel feeder, which is mixed therewith before the reentrance of said branch current into the main current. To this end the present invention contemplates the idea of setting up at one point in a current of blast air, an increase in velocity, diverting a branch current of air which passes through the feeder receiving fuel, said branch current returning to the current of blast air at the point of increased velocity. The effect of the increase in velocity at this point is to maintain a flow of air through the branch conduit, the velocity of which is decreased by the handling of the pulverized fuel. Owing to the difference of velocity in the branch conduit and the point of increased velocity, a feeding of the mixed fuel and air into the main current of air results.

With the above and other objects in view an apparatus is shown in the drawings by way of example for carrying out my invention and the invention will be hereinafter more fully described with reference thereto, and finally pointed out in the appended claims.

In the drawings:

Fig. 1 is a vertical sectional view of a form of apparatus suitable for carrying out our invention; and Fig. 2 is a horizontal section of the venturi structure.

Referring to the drawings, a main conduit 10 is connected at one end to a blower for supplying blast air thereto, and at its other end extends into the fire-box of the furnace. At a point intermediate its end a venturi structure is provided as at 11, the effect of this being to increase the velocity at this point.

From a point in the main conduit 10 ahead of (on the way to) the venturi structure, a secondary branch conduit 12 extends from the conduit 10 to the pulverized fuel feeder 13. As shown, the branch conduit 12 is smaller than the main conduit 10, so that adequate air velocity may be maintained therein by the constriction of the main conduit at 11. The feeder 13 may be of any suitable construction and in this example includes a screw conveyor $13^a$ below the fuel bin $13^b$, which feeds fuel into the current of air, a mixing paddle $13^c$ being provided upon the shaft of the conveyor in the path of the current of air. The conduit 12 is extended at the outlet end of the feeder and returns to the conduit 10, terminating in a forwardly bent delivery jet nozzle $12^a$ having its outlet disposed in the restricted orifice of the venturi structure. The end of the nozzle may preferably be shiftable longitudinally to adjust its position relatively to the region of increased velocity in the restricted portion of the venturi. For this purpose we provide upon the nozzle a slidable sleeve 14 having a pair of lugs $14^a$ and $14^b$ and connected by links 15 to the cranks lever 16 mounted upon a transverse shaft 17 journaled in bearings 18 and 19. At one end the shaft 17 has an operating handle 20, which upon being turned shifts the sleeve 14 and thereby adjusts the end of the nozzle.

The operation is as follows:

Blast air flows from the blower through the conduit 10 at a given velocity. Assuming this velocity to be $x$, the velocity of the air passing through the venturi is $x$ plus the effect of the venturi, that is an increase in velocity at this point. Because of this difference in velocity at the point of divergence of the current of air through the conduit 12 and its point of reentrance to the conduit at the venturi, a flow is set up through this conduit 12, into which the fuel is fed and mixed from the feeder. The fuel thus mixed with air is ultimately ejected from the nozzle into the main current of air passing through the conduit 10, whereupon this mixed fuel and air is carried with the main current to the furnace. The velocity in the conduit 10 at the outlet side of the feeder and the venturi is $x$ velocity minus velocity utilized in the work of handling the pulverized fuel for the venturi, of course, can only locally increase the velocity in the main conduit. The suction action created in the tube 12 by the effect of the venturi causes ejection of the mixed fuel and air at a relatively great velocity. By regulating the nozzle through the handle 20 this may be accurately controlled.

With our invention the mixing of the fuel with air and the feeding of the fuel and air is carried out with a single source of blast air, resulting in a compact, simple, and economical structure.

We have described a preferred embodiment of carrying out our invention and illustrated a suitable and preferred form of apparatus, but it is obvious that changes may be made therein within the spirit and scope thereof as defined in the appended claims, and that the invention is applicable to the feeding of other substances than pulverized fuel.

We claim:

1. In fuel feeding apparatus, the combination of a main conduit for passage of blast air, with a venturi therein; a smaller secondary conduit branching from the main conduit at a point on the way to said venturi and returning to the main conduit at the throat of said venturi, and having therein an air current of less velocity than the current in the main conduit; with a feeder in said secondary conduit for feeding fuel into the current therethrough, for delivery to and admixture with the main current.

2. In fuel feeding apparatus, the combination of a main conduit for passage of blast air, with means for increasing the velocity of the air blast at a point therein; a smaller secondary conduit branching from the main conduit at a point on the way to said velocity increasing means and returning to the main conduit at said means, and having therein an air current of less velocity than the current in the main conduit; with a feeder in said secondary conduit for feeding fuel into the current therethrough for delivery to and admixture with the main current, and means for varying and regulating the position of the secondary conduit outlet into the main conduit in the region of increased velocity in said conduit.

3. In fuel feeding apparatus, the combination of a main conduit for passage of blast air, with a venturi therein; a smaller secondary conduit branching from the main conduit at a point on the way to said venturi and returning to the main conduit at the throat of said venturi, and having therein an air current of less velocity than the current in the main conduit; with a feeder in said secondary conduit for feeding fuel into the current therethrough, for delivery to and admixture with the main current, and a delivery nozzle in the venturi throat discharging in the direction of the main air current and adjustable in the same direction.

In testimony that they claim the foregoing as their invention, they have signed their names hereunder.

JOHN E. MUHLFELD.
VIRGINIUS Z. CARACRISTI.